(12) United States Patent
Marti et al.

(10) Patent No.: US 9,301,097 B2
(45) Date of Patent: Mar. 29, 2016

(54) CORRELATING WIRELESS SIGNALS TO A LOCATION ON AN IMAGE USING MOBILE SENSOR TECHNOLOGIES

(71) Applicant: POINT INSIDE, INC., Bellevue, WA (US)

(72) Inventors: Joshua L. Marti, Bellevue, WA (US); Jonathan A. Croy, Seattle, WA (US)

(73) Assignee: POINT INSIDE, INC., Bellevue, WA (US)

( * ) Notice: Subject to any disclaimer, the term of this patent is extended or adjusted under 35 U.S.C. 154(b) by 659 days.

(21) Appl. No.: 13/663,362

(22) Filed: Oct. 29, 2012

(65) Prior Publication Data

US 2013/0115971 A1    May 9, 2013

Related U.S. Application Data

(60) Provisional application No. 61/552,092, filed on Oct. 27, 2011.

(51) Int. Cl.
H04W 4/02    (2009.01)

(52) U.S. Cl.
CPC .................................. *H04W 4/025* (2013.01)

(58) Field of Classification Search
CPC ... H04W 64/003; H04W 88/06; H04W 4/005; H04W 4/023; H04W 4/025; H04W 4/22

USPC ................................. 455/456.1; 702/92, 116
See application file for complete search history.

(56) References Cited

U.S. PATENT DOCUMENTS

| | | | | |
|---|---|---|---|---|
| 7,974,627 | B2 * | 7/2011 | Mia | H04W 64/003 370/331 |
| 8,045,482 | B2 * | 10/2011 | Davis | G01S 5/0009 370/254 |
| 8,355,887 | B1 * | 1/2013 | Harding | G06F 3/017 702/158 |
| 2003/0149528 | A1 * | 8/2003 | Lin | G01C 21/165 701/472 |
| 2008/0109182 | A1 * | 5/2008 | Min | H04N 5/349 702/104 |

\* cited by examiner

*Primary Examiner* — George Eng
*Assistant Examiner* — Joseph Dean, Jr.
(74) *Attorney, Agent, or Firm* — Schwabe, Williamson & Wyatt, P.C.

(57) ABSTRACT

Using ground truth events and sensors available on a first mobile device, an algorithm executed at the first mobile device determines the mobile device's position; the first mobile device also obtains wireless signal information; the wireless signal information is associated with the position determined via the sensor data and ground truth events; the associated data is stored and may be sent to or used by a second device; the second device may then, for example, detect then-current wireless signal information and may locate the second device by looking up the then-current wireless signal information in the associated data.

19 Claims, 4 Drawing Sheets

CORRELATING WIRELESS SIGNALS TO A LOCATION ON AN IMAGE USING MOBILE SENSOR TECHNOLOGIES

RELATIONSHIP TO OTHER APPLICATIONS AND PRIORITY CLAIM

This application claims the benefit of and incorporates by this reference, provisional patent application No. 61/552,092, filed Oct. 27, 2011.

BACKGROUND

Stationary and mobile computing devices—including cellular telephones and a range of other portable computers—include many electro-magnetic radiation-based one- and two-way wireless communication technologies, such as cellular telephone technologies, GPS, WIFI, Bluetooth, and Near-Field Communication ("NFC"). These wireless systems emit and receive electro-magnetic radiation, typically in the radio frequency bands, with various characteristics, such as signal strength and wireless channel (or frequency or frequency-block) utilization. Fixed and wireless data networks also commonly include information in the networks' bit stream such as "Media Access Control address" ("MAC address"), "Ethernet hardware address" ("EHA"), or "Physical Address," which, generally, are unique identifiers assigned to a network interface or network node. As used herein, "Wireless Signal Information" is any radio frequency (e.g., WiFi, Bluetooth, NFC, etc.) or timing signal (e.g., Ultra-wideband or "UWB") that is detectable by a mobile device and can be associated with a unique terminal, such as via MAC address.

Many of the wireless systems mentioned above enable communication between a first computing device and other computing devices and/or they may be used to locate the first computing device in a network or in physical space.

Systems exist which create digital images utilizing pixels and which display digital images on computing devices with pixel-based display technologies.

Many mobile computing devices now also contain one or more sensors, such as multi-axis gyros, compasses, barometers, accelerometers, microphones or other hardware or software base technologies, which technologies are used within mobile devices to detect changes in position and orientation.

However, not known are systems which determine a user's position in a pixel-based image from user interaction and from sensors and which correlate this position information with wireless signal information, the resulting information being stored and made available to other computing devices so that the other computing devices can, for example, locate themselves based on then-available wireless signal information.

Needed is a method and system to determine the position of a mobile device in a pixel-based image based on user input and sensor data, to contemporaneously receive and log wireless signal information, to correlate and store the resulting information, and to make the correlated information available to other computing devices.

SUMMARY

Using ground truth events and sensors available on a first mobile device, an algorithm executed at the first mobile device determines the mobile device's position; the first mobile device also obtains wireless signal information; the wireless signal information is associated with the position determined via the sensor data and ground truth events; the associated data is stored and may be sent to or used by a second device; the second device may then, for example, detect then-current wireless signal information and may locate the second device by looking up the then-current wireless signal information in the associated data.

DETAILED DESCRIPTION

As used herein, "sensors" comprise multi-axis gyros, compass, barometer, accelerometer, GPS, microphone or other hardware or software base technologies used within the mobile device, which technologies are used within the mobile device to detect changes in position and orientation. "Dead reckoning" is a method of determining motion and distance traveled including vector information. "Wireless signal information" is any radio frequency (e.g., WiFi, Bluetooth, NFC, etc.) or timing signal (e.g., UWB) that is detected by the Mobile Device and can be associated with a unique terminal (e.g., MAC address or similar). A "pixel coordinate" identifies a location in space corresponding to pixel coordinates in an image. A "ground truth event" is an explicit act on behalf of or by the user of the mobile device to specify the location of the user or the mobile device. A ground truth event may comprise a user touching an image of a map (or otherwise identifying coordinates on a map) or may comprise taking a photo of a barcode, QR Code, at location with a known coordinate position, or pixel coordinate, relative to an image or may comprise becoming proximate to an NFC or other wireless device at location with a known coordinate position or pixel coordinate relative to an image.

Figure 1:
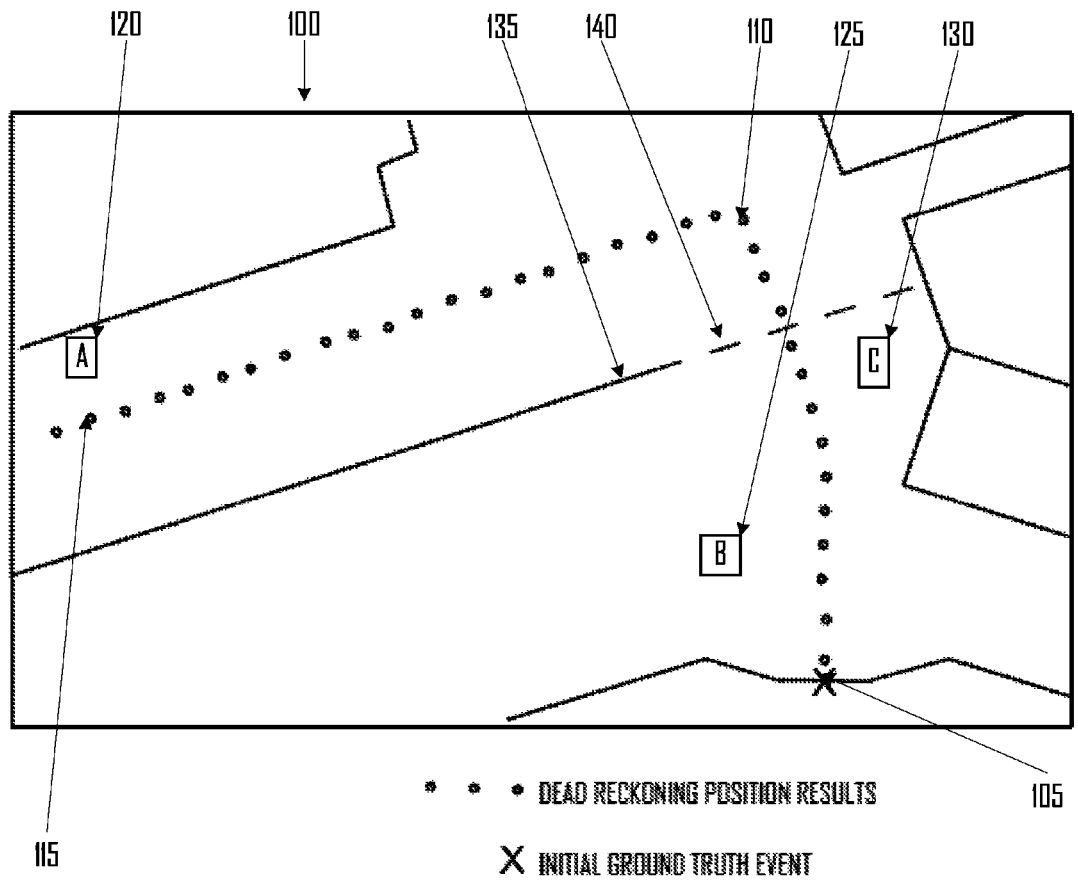
FIG. 1 is a diagram of a user traveling in a building, illustrating a "Ground Truth Event," a sensor-determined path of the user, and wireless base stations "A," "B," and "C."
Figure 2:
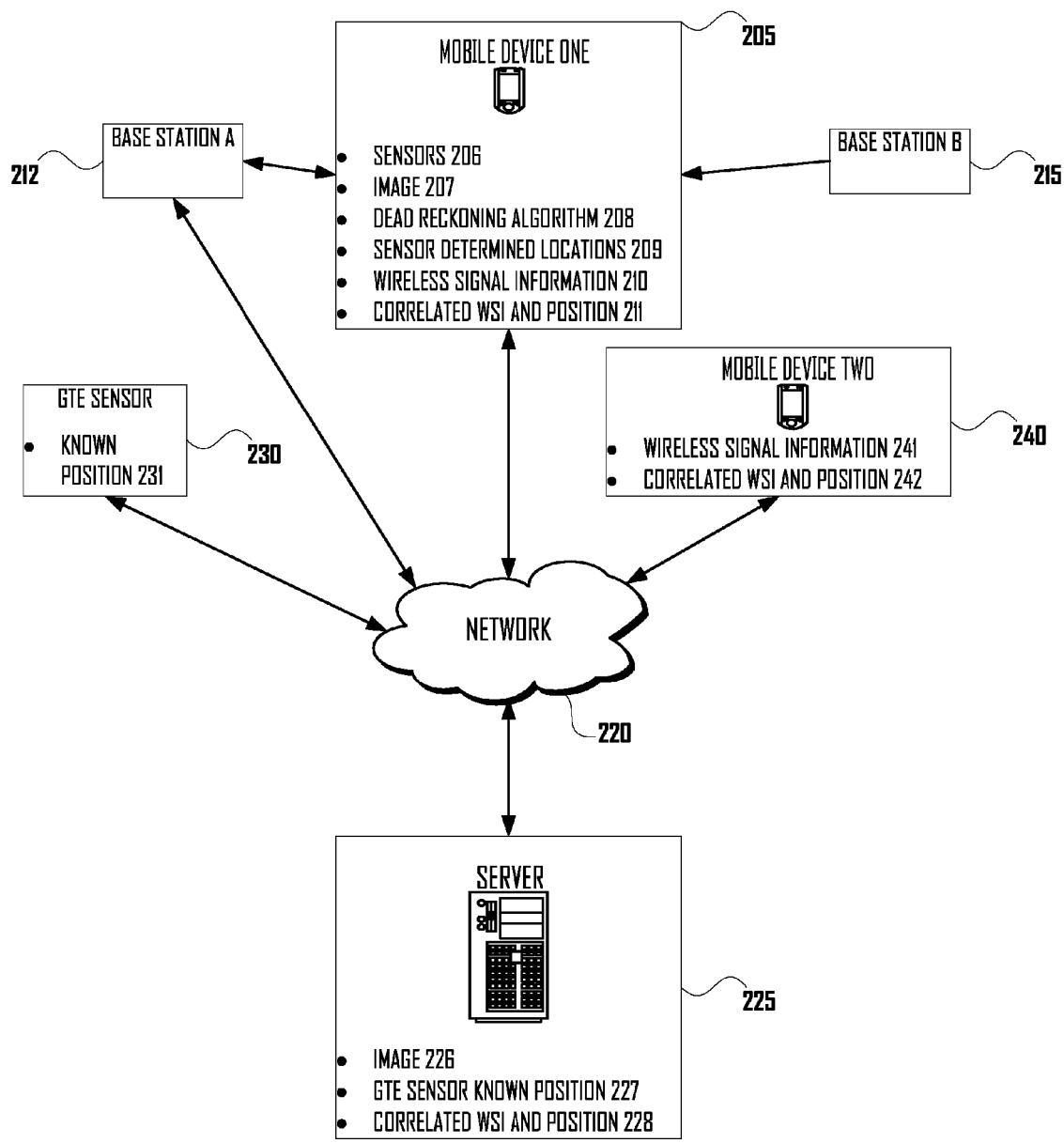
FIG. 2 is a network and device diagram illustrating two mobile devices, two wireless base stations, a Network, and a Server.
Figure 3:
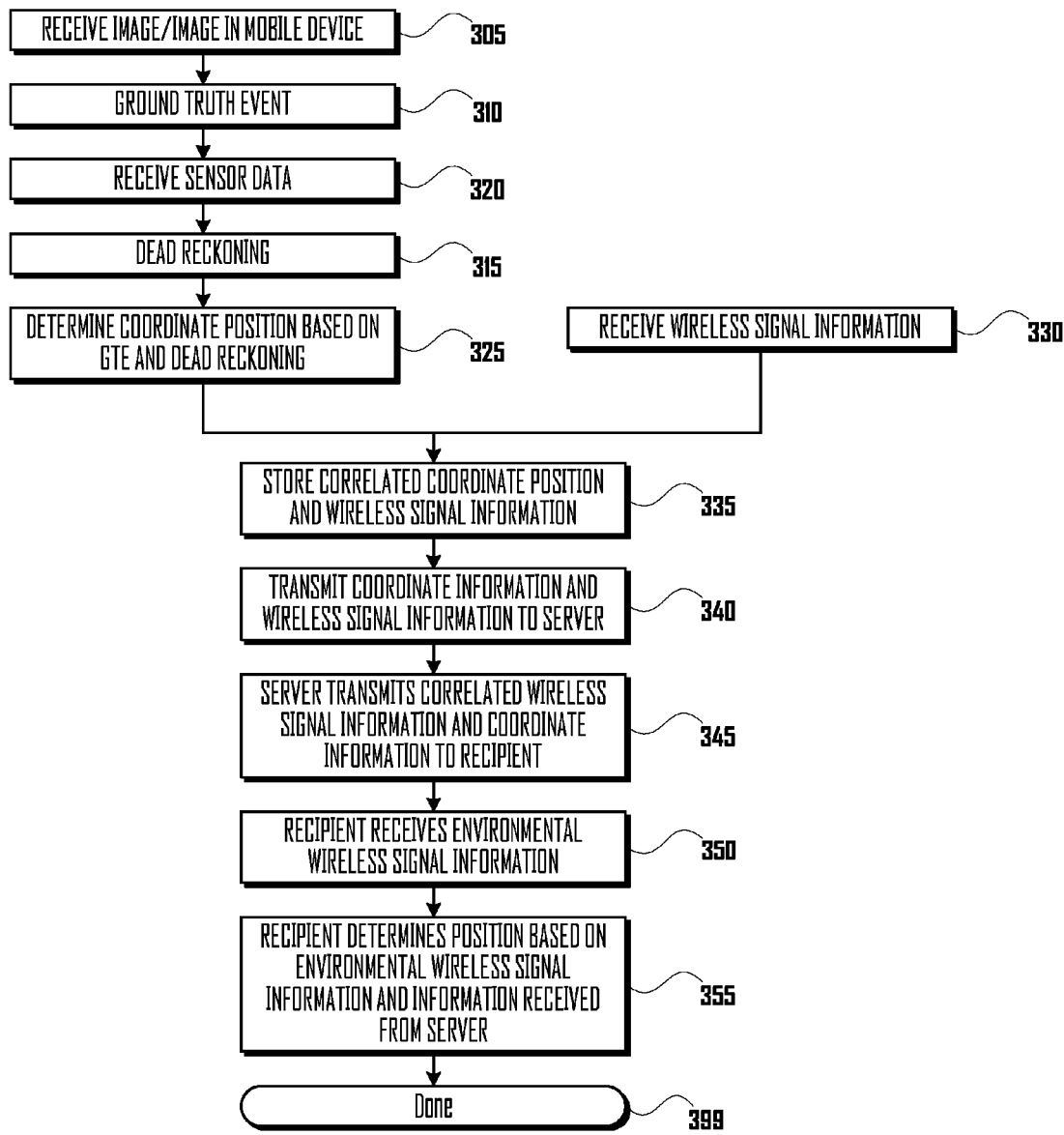
FIG. 3 is an outline of a process in which a first mobile device's coordinate position is determined based on user input and sensor data, in which wireless signal information is received, in which the determined coordinate position and the wireless signal information are sent to a server and stored, and in which the correlated information is used to determine coordinate position by a second wireless device.

Referring to FIGS. 1, 2, and 3, an image, such as Image 226, has been sent to a mobile device, such as Mobile Device 1, 205, or is otherwise present on Mobile Device One 205, as Image 207; step 305 in FIG. 3. Image 207 may be rendered at Mobile Device One 205 as image 100 in a display with which the user can interact (such as via touch screen, a moveable cursor) with to indicate the user's position in the image.

At location 105, a ground truth event occurs; step 310 in FIG. 3. The ground truth event may be the user of Mobile Device One 205, touching the Image 100, such as a touch-screen in Mobile Device One 205, to indicate the user's position (and that of Mobile Device One 205); the ground truth event may also occur when the user becomes proximate to a Ground Truth Event Sensor, such as "GTE 230" in FIG. 2. As noted above, this may involve the user of the Mobile Device One 205 taking a photograph of the GTE 230 or it may involve the detection of proximity by sensors in Mobile Device One 205 and/or in the GTE Sensor 230. The GTE 230 may comprise data for its Known Position 231 (which data may be communicated to the Mobile Device One 205) or the known position of GTE 230 may be known by Server 225 (or by the Mobile Device One 205), such as GTE Sensor Known Position 227, in which case the GTE 230 and/or the Mobile Device One 205, may report (such as to the Mobile Device One 230, and/or to the Server 225) that the Mobile Device One 205 and GTE 230 became proximate, which report may be reported back to the Mobile Device One 205 as a location. The ground truth event occurs and is stored at step 310 as a location, such as a set of coordinates in the Image 207, a latitude and longitude, an address, or similar.

At step 320, the Mobile Device One 205 receives sensor data, such as from Sensors 206. At step 315, the Mobile Device One 205 (or the Server 225, using sensor data received from the Mobile Device One 205) may execute Dead Reckoning Algorithm 208 to determine the position of the user (or, equivalently, the Mobile Device One 205, carried by the user) relative to the ground truth event 105 and the coordinate positions in Image 207 (100, in FIG. 1), which coordinate positions may be stored in the Mobile Device One 205 as Sensor Determined Locations 209; illustrated in FIG. 3 as step 325. The Dead Reckoning Algorithm 208 may determine the position of the user, for example, based on vector analysis of changes in the sensor data. The sequence of circles in FIG. 1 represents coordinate positions determined by the Dead Reckoning Algorithm 208. More than one set of sensor data may be received, which sensors operate at different sample rates, all of which may be input into the Dead Reckoning Algorithm 208.

At step 330, the Mobile Device One 205 receives and stores Wireless Signal Information 210, received from, for example, Base Station A 212 (120 in FIG. 1), Base Station B 215 (125 in FIG. 1), and Base Station C (130 in FIG. 1; not shown in FIG. 2). At step 335, the Wireless Signal Information 210 received at the Sensor Determined Locations 209 is stored in association with the Sensor Determined Locations 209.

FIG. 1 illustrates the user passing through a building, through a security perimeter at the dotted line at 140, and then along a path illustrated by a sequence of circles, passing by Base Stations B (125), C (130), and A (120), while performing the process discussed above.

At step 340, the stored and correlated Wireless Signal Information 210 and Sensor Determined Locations 209 are transmitted, for example, to the Server 225, where the correlated information may be stored as Correlated WSI and Position 228. Transmission to the Server 225 may be in batches or in real time.

At step 345, the Server 225 may transmit the Correlated WSI and Position 228 to a recipient, such as Mobile Device Two 240 (represented in FIG. 2 as Correlated WSI and Position 242).

At step 350, the recipient, such as Mobile Device Two 240 receives Wireless Signal Information 241 from the environment, such as from, for example, Base Station A 212 (120 in FIG. 1), Base Station B 215 (125 in FIG. 1), and Base Station C (130 in FIG. 1).

At step 355, the recipient, such as Mobile Device Two 240, uses the Wireless Signal Information 241 and the Correlated WSI and Position 242 to determine the location of Mobile Device Two 240. Examples of how to determine location include a best-fit of the Wireless Signal Information 241 to the wireless signal information in the Correlated WSI and Position 242 and extracting the corresponding position from the Correlated WSI and Position 242.

Capturing the Wireless Signal Information 210 and 241 may be by a routine or application on the mobile devices, which captures the Wireless Signal Information as frequently as the rate of change in, for example, the Sensor Determined Locations 209. If the user moves at a pace of 100 pixels per second then the Wireless Signal Information could be captured at this same rate or a lesser rate.

Following is Table 1, containing position events, locations in pixel coordinates in an image (the pixel coordinates do not necessarily map onto the image in FIG. 1), and Wireless Signal Information (the locations of Base Stations A, B, and C in FIG. 1 are provided as approximate examples). Table 1 may be a sample of Correlated Wireless Signal Information and Position.

TABLE 1

| Position Event | Location | Wireless Signal Information, where<br>A = FIG. 1, 120<br>B = FIG. 1, 125<br>C = FIG. 1, 130 |
|---|---|---|
| Initial Ground Truth Event FIG. 1, 105 | Pixel Coordinate (345, 819) | A. Physical Address: 70-1A-04-A6-A4-C0; Channel 6; Signal Strength: −89dBm<br>B. Physical Address: 00-E0-8C-6C-8F-61; Channel 1; Signal Strength: −45dBm<br>C. Physical Address: 00-19-C0-61-9D-62; Channel 11; Signal Strength: −73dBm |
| Dead Reckoning Event 1 FIG. 1, 110 | Pixel Coordinate (346, 810) | A. Physical Address: 70-1A-04-A6-A4-C0; Channel 6; Signal Strength: −83dBm<br>B. Physical Address: 00-E0-8C-6C-8F-61; Channel 1; Signal Strength: −54dBm<br>C. Physical Address: 00-19-C0-61-9D-62; Channel 11; Signal Strength: −76dBm |
| Dead Reckoning Event 2 FIG. 1, 115 | Pixel Coordinate (345, 800) | A. Physical Address: 70-1A-04-A6-A4-C0; Channel 6; Signal Strength: −62dBm<br>B. Physical Address: 00-E0-8C-6C-8F-61; Channel 1; Signal Strength: −66dBm<br>C. Physical Address: 00-19-C0-61-9D-62; Channel 11; Signal Strength: −92dBm |

In FIG. 2, Mobile Device One 205 and Mobile Device Two 240 may be portable computers, cell phones, tablet computers, laptops, or other similar computers. The Mobile Devices can at least receive transmissions from at least one of the Base Stations (Base Station A, 212, and Base Station B, 215). The Mobile Devices may or may not be able to form a network connection with one or both of the Base Stations. The Base Stations may or may not have a connection to the Network 220. The Mobile Devices need to be able to obtain an identifier for the Base Stations, such as the "Physical Address" listed above in Table 1, in addition to the signal strength. Server 225 may be a computing device. Server 225 may represent more than one computing device.

Figure 4:
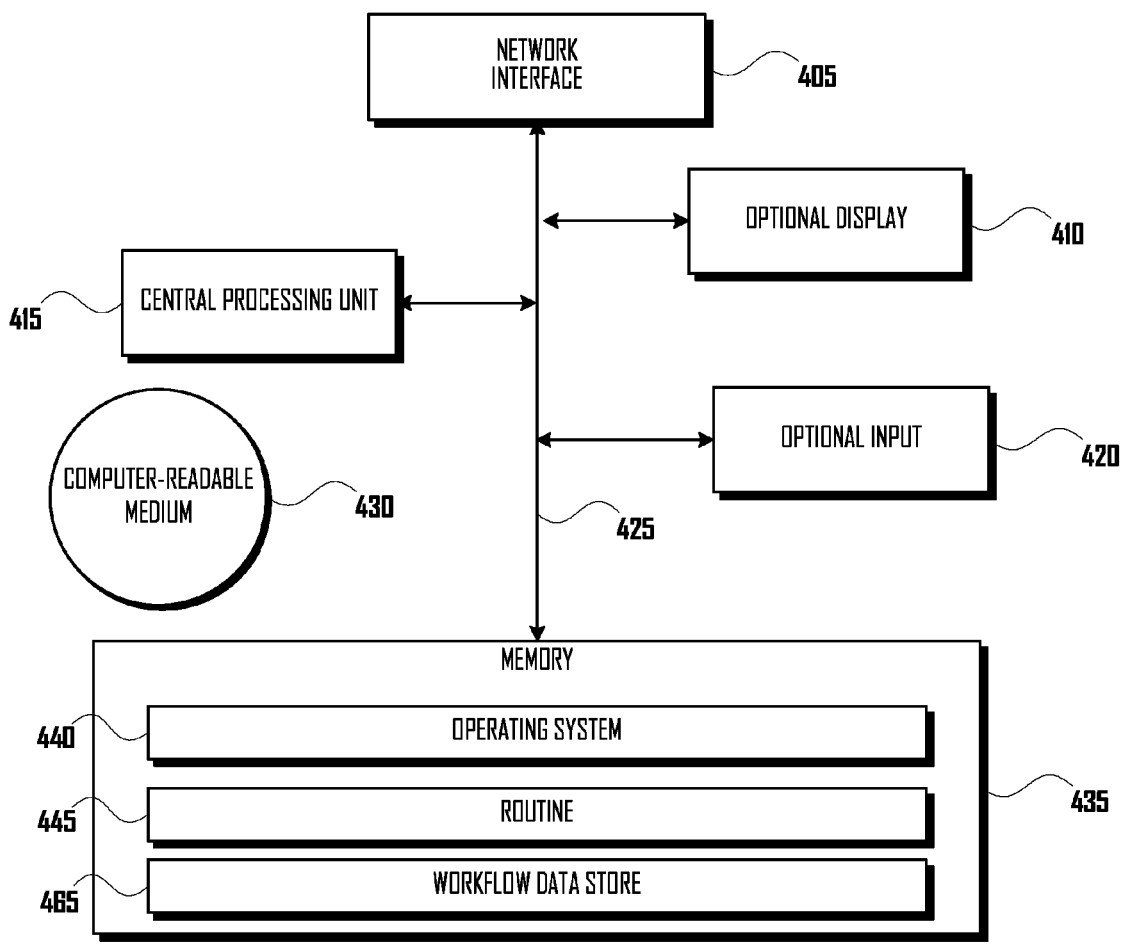
FIG. 4 is a functional block diagram of exemplary computing devices and some data structures and/or components thereof.

FIG. 4 is a functional block diagram of exemplary computing devices and some data structures and/or components thereof, such as the computing devices shown in the other figures. In some embodiments, the computing device 400 may include many more components than those shown in FIG. 4. However, it is not necessary that all of these generally conventional components be shown in order to disclose an illustrative embodiment. As shown in FIG. 4, the computing device 400 includes a network interface 405 for connecting to the network 220.

The computing device 400 also includes at least one processing unit 415, memory 435, and an optional display 410, all interconnected along with the network interface 405 via a bus 425. The memory 435 generally comprises a random access memory ("RAM"), a read only memory ("ROM"), and a permanent mass storage device, such as a disk drive or SDRAM (synchronous dynamic random-access memory). The memory 435 stores program code for routines 445, such as, for example, the dead reckoning algorithms, as well as web browsing applications, web serving applications, email servers and client applications, and database applications. In addition, the memory 435 also stores an operating system 440. These software components may be loaded from a non-transient computer readable storage medium 430 into memory 435 of the computing device 400 using a drive mechanism (not shown) associated with a non-transient computer readable storage medium 430, such as a floppy disc, tape, DVD/CD-ROM drive, memory card, or other like storage medium. In some embodiments, software components may also or instead be loaded via a mechanism other than a drive mechanism and computer readable storage medium 430 (e.g., via network interface 405).

The computing device 400 may also comprise hardware supporting optional input modalities, Optional Input 420, such as, for example, a touchscreen, a keyboard, a mouse, a trackball, a stylus, a microphone, and a camera.

Computing device 400 also comprises or communicates via bus 425 with workflow data store 465. In various embodiments, bus 425 may comprise a storage area network ("SAN"), a high speed serial bus, and/or via other suitable communication technology. In some embodiments, computing device 400 may communicate with workflow data store 465 via network interface 405.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A method of correlating wireless signals to a location in an image in a first computer comprising a memory, comprising:
    at the first computer, receiving the image from a second computer;
    receiving a ground truth event at the first computer, which ground truth event determines the first computer to be at a first position in the image and identifying a first map coordinate corresponding to the first position;
    receiving data from sensors at the first computer;
    determining a second position and a second map coordinate corresponding to the second position of the first computer based on the data received from the sensors;
    at times proximate to when the first and second positions were determined, sampling wireless signal information at the first computer, which wireless signal information comprises radio-frequency energy emitted by a component of a wireless data network;
    storing the wireless signal information in association with the determined first and second position as correlated wireless signal and determined position information; and
    transmitting the correlated wireless signal and determined position information to a second computer.

2. The method of claim 1, further comprising the second computer transmitting the correlated wireless signal and determined position information to a third computer.

3. The method of claim 1, wherein determining the second position of the first computer is performed at a first rate and wherein sampling the wireless sign information is performed at a second rate.

4. The method of claim 3, wherein the second rate is selected to be equal to or less than the first rate.

5. The method of claim 1, further comprising outputting the image in a user interface of the first computer and wherein the ground truth event comprises receiving an indication that a user touched a portion of the image in a user interface of the first computer.

6. The method of claim 5, wherein the touched portion of the image corresponds to coordinates in a map, which coordinates are assigned as the first position.

7. The method of claim 1, wherein the user event comprises receiving an indication that a user contacted a ground truth event sensor.

8. The method of claim 7, wherein the ground truth event sensor is mapped to coordinates in a map.

9. The method of claim 8, wherein the ground truth event sensor comprises at least one of a barcode, a QR code, and a near field communication device.

10. The method of claim 9, further comprising sending data associated with the user event to the second computer and receiving the first position from the second computer.

11. The method of claim 9, wherein the ground truth event sensor communicates the first position to the first computer.

12. The method of claim 1, wherein the sensors at the first computer comprise at least one of a gyro, a compass, a barometer, and an accelerometer.

13. The method of claim 1, wherein the second position is determined by vector analysis of the sensor data.

14. The method of claim 1, wherein the image comprises pixels and wherein the pixels are mapped to coordinates of a physical location.

15. The method of claim 1, wherein the wireless signal information comprises an identifier of the device which emitted the wireless signal information.

16. The method of claim 1, wherein the wireless signal information comprises a power level of the wireless signal information.

17. A computer system with a non-transitory computer readable medium comprising instructions which, when executed, perform a method comprising:
receiving a user event at the first computer, which user event associates the first computer with a first position in the image;
receiving data from sensors at the first computer;
determining a second position of the first computer based on the data received from the sensors;
sampling wireless signal information at the first computer;
storing the wireless signal information in association with the determined second position as correlated wireless signal and determined position information; and
transmitting the correlated wireless signal and determined position information to a second computer;
the second computer transmitting the correlated wireless signal and determined position information to a third computer; and
wherein the third computer samples wireless signal information and uses the wireless signal information sampled by the third computer and the correlated wireless signal and determined position information received from the second computer to determine the location of the third computer.

18. A method of correlating wireless signals to a location in an image in a first computer comprising a memory, comprising:
receiving a user event at the first computer, which user event associates the first computer with a first position in the image;
receiving data from sensors at the first computer;
determining a second position of the first computer based on the data received from the sensors;
sampling wireless signal information at the first computer;
storing the wireless signal information in association with the determined second position as correlated wireless signal and determined position information; and
transmitting the correlated wireless signal and determined position information to a second computer;
the second computer transmitting the correlated wireless signal and determined position information to a third computer; and
wherein the third computer samples wireless signal information and uses the wireless signal information sampled by the third computer and the correlated wireless signal and determined position information received from the second computer to determine the location of the third computer.

19. The method of claim 18, wherein the third computer determines the location of the third computer by matching the wireless signal information sampled by the third computer to the wireless signal information in the correlated wireless signal and determined position information and selecting the location in the correlated wireless signal and determined position information corresponding to the wireless signal information sampled by the third computer.

\* \* \* \* \*